United States Patent
Kang et al.

(10) Patent No.: US 10,066,405 B2
(45) Date of Patent: Sep. 4, 2018

(54) SYSTEM FOR MONITORING TENSION FORCE OF TENDON IN POST-TENSIONING

(71) Applicants: SEOUL NATIONAL UNIVERSITY R&DB FOUNDATION, Seoul (KR); TOTAL PS CO., LTD., Seoul (KR)

(72) Inventors: Thomas Hyun Koo Kang, Seoul (KR); Kee Nam Jeong, Namyangju-si (KR)

(73) Assignees: SEOUL NATIONAL UNIVERSITY R&DB FOUNDATION, Seoul (KR); TOTAL PS CO., LTD., Seoul (KR)

(*) Notice: Subject to any disclaimer, the term of this patent is extended or adjusted under 35 U.S.C. 154(b) by 0 days.

(21) Appl. No.: 15/509,519

(22) PCT Filed: Jul. 29, 2016

(86) PCT No.: PCT/KR2016/008331
§ 371 (c)(1),
(2) Date: Mar. 8, 2017

(87) PCT Pub. No.: WO2017/018845
PCT Pub. Date: Feb. 2, 2017

(65) Prior Publication Data
US 2017/0284111 A1    Oct. 5, 2017

(30) Foreign Application Priority Data
Jul. 29, 2015    (KR) .................. 10-2015-0107506

(51) Int. Cl.
*E04G 21/12*    (2006.01)
*G01B 21/02*    (2006.01)
*G01L 19/08*    (2006.01)

(52) U.S. Cl.
CPC ........... *E04G 21/121* (2013.01); *G01B 21/02* (2013.01); *G01L 19/083* (2013.01); *G01L 19/086* (2013.01); *H05K 999/99* (2013.01)

(58) Field of Classification Search
CPC ...... E04G 21/121; G01B 21/02; G01L 19/083
(Continued)

(56) References Cited

U.S. PATENT DOCUMENTS 4,538,467 A * 9/1985 Stoll .................. G01N 3/00
73/803
6,815,948 B1 * 11/2004 Kwun .................. G01N 27/82
324/238
(Continued)

FOREIGN PATENT DOCUMENTS

JP        09-217493 A    8/1997
JP        10-102776 A    4/1998
(Continued)

*Primary Examiner* — Max Noori
(74) *Attorney, Agent, or Firm* — Rabin & Berdo, P.C.

(57) ABSTRACT

A system for monitoring tension forces of tendons in post-tensioning includes a hydraulic jack to apply the tension force to the tendon, a hydraulic pump to supply a hydraulic pressure to the hydraulic jack, a digital elongation length measurement sensor to measure the elongation length of the piston, a measurement unit having a data logger adapted to receive and store the elongation length data measured by the digital elongation length measurement sensor and to send the elongation length data to a main server, a digital pressure measurement sensor, and a control module adapted to receive the elongation length data from the data logger or the main server, calculate the tension force, compensate for the coefficient of elasticity of the tendon according to the ratio of the real-time elongation length data to the pressure data, and compensate for the tension force calculated.

4 Claims, 6 Drawing Sheets

(58) Field of Classification Search
USPC .......................................................... 73/760
See application file for complete search history.

(56) References Cited

U.S. PATENT DOCUMENTS

| | | | |
|---|---|---|---|
| 9,745,712 B2* | 8/2017 | Henderson | ............ E02D 27/425 |
| 2007/0271762 A1* | 11/2007 | Hohensee | ............. E04G 21/121 |
| | | | 29/452 |
| 2013/0255169 A1* | 10/2013 | Henderson | .............. E04C 5/125 |
| | | | 52/223.13 |

FOREIGN PATENT DOCUMENTS

| | | | |
|---|---|---|---|
| JP | 10-299253 A | 11/1998 |
| JP | 3683112 B2 | 8/2005 |
| KR | 10-2013-0057245 A | 5/2013 |

* cited by examiner

SYSTEM FOR MONITORING TENSION FORCE OF TENDON IN POST-TENSIONING

TECHNICAL FIELD

The present invention relates to a system for monitoring tension forces of tendons in post-tensioning that accurately measures the tension forces of the tendons and/or controls the tension forces introduced into the tendons through a main server, thereby allowing the tension forces to be applied uniformly to the tendons.

BACKGROUND ART

Post-tensioning is a method of applying prestress to concrete. In more detail, tendons are tensioned and anchored in concrete after the concrete has been cured to allow the tension forces to be introduced to the tendons.

A plurality of tendons are arranged in concrete beams or slabs, and in this case, it is important to minimize the deviation in the tension forces introduced to the plurality of tendons so as to allow the tension forces to be applied uniformly to the plurality of tendons. It is actually recommended that the error range between a designed tension force and a real tension force is controlled within the average of 7% and to the maximum of 13%.

In conventional post-tensioning, the tension force of the tendon is measured by reading the pressure gauge of a pressure pump and by measuring the moving distance of a piston of a hydraulic jack.

However, the conventional measuring methods are carried out in an analog way, thereby undesirably needing many labors in monitoring the tension forces of the tendons.

Further, the pressure gauge or the moving distance of the piston is measured by a checker, and at the same time, the buttons for stopping the tensioning are pressed manually to control the tension forces of the tendons, so that the tension forces of the tendons are differently applied every time. That is, there are many differences in the measurement and control of the tension forces, constructability, and working time according to the skill level of a worker, thereby making it difficult to conduct accurate tensioning.

Moreover, the elongation length of the tendon after the tensioning is measured by a ruler to check the error range, but the elongation lengths of the tendons may be different from each other according to the friction coefficients of the tendons or the lengths of steel strands, so that even if the elongation lengths are measured, there is no method of accurately recognizing the sizes of the tension forces applied to the tendons.

In addition, the pressure gauge data or the moving distance data of the piston and the elongation length data measured by the ruler are provided only by the record of the worker on the construction site, so that only the values on the record exist as database.

Accordingly, it is impossible to accurately measure the tension forces of the tendons so that error control is meaningless.

DISCLOSURE

Technical Problem

Accordingly, the present invention has been made in view of the above-mentioned problems occurring in the prior art, and it is an object of the present invention to provide a system for monitoring tension forces of tendons in post-tensioning that accurately measures the tension forces of the tendons and/or controls the tension forces introduced into the tendons through a main server, thereby allowing the tension forces to be applied uniformly to the tendons.

Technical Solution

To accomplish the above-mentioned object, according to the present invention, there is provided a system for monitoring tension forces of tendons disposed inside a concrete structure in post-tensioning, the system including: a hydraulic jack coupled to one tendon at one end of the concrete structure to apply the tension force to the tendon by the forward movement of a piston; a hydraulic pump connected to the hydraulic jack by a hydraulic pressure supply pipe to supply a hydraulic pressure to the hydraulic jack; a digital elongation length measurement sensor disposed on the hydraulic jack to measure the elongation length of the piston; a measurement unit having a data logger adapted to receive and store the elongation length data measured by the digital elongation length measurement sensor and to send the elongation length data to a main server; a digital pressure measurement sensor disposed on the hydraulic pressure supply pipe of the hydraulic pump; and a control module adapted to receive the elongation length data from the data logger or the main server, calculate the tension force, compensate for the coefficient of elasticity of the tendon according to the ratio of the real-time elongation length data to the pressure data, and compensate for the tension force calculated.

According to the present invention, desirably, if the pressure data measured by the digital pressure measurement sensor reaches a set value, the hydraulic pump is controlled by the control module to stop the operation of the hydraulic jack.

According to the present invention, desirably, the measurement unit includes a near field communication module for transmitting the collected data to a mobile terminal, and the mobile terminal transmits the received data to the main server.

According to the present invention, desirably, a reference point is marked on one side of the tendon exposed to the outside of the concrete structure, and a position sensor is disposed on one side of the hydraulic jack to measure the moving distance of the reference point, so that after the operation of the hydraulic jack stops by the control module, the compensation for the elongation length is performed according to the moving distance of the reference point measured by the position sensor.

Advantageous Effects

According to the present invention, the system for monitoring tension forces of tendons in post-tensioning has the following advantages.

Firstly, the elongation length of the piston of the hydraulic jack can be accurately measured through the digital elongation length measurement sensor and the measured elongation length is multiplied by the coefficient of elasticity of the tendon to accurately measure the tension force of each tendon, so that the tension forces introduced to the plurality of tendons can be controlled through the main server, thereby permitting the controlled tension forces to be uniformly applied to the plurality of tendons.

Secondly, if the digital pressure measurement sensor is provided, the pressure of the fluid supplied to the hydraulic jack from the hydraulic pump can be measured to calculate the tension force of the tendon, so that in addition to the measurement of the tension force of the tendon using the elongation length of the piston of the hydraulic jack, the tension force of the tendon can be doubly measured through the digital pressure measurement sensor, thereby making it possible to calculate the tension force of the tendon more accurately.

Thirdly, the hydraulic pump is controlled with the pressure data to allow the operation of the hydraulic jack to stop, thereby preventing the tendon from being momentarily yielded.

Fourthly, the near field communication module is disposed in the measurement unit so that the tension force of the tendon can be monitored in real time through the mobile terminal in any place.

Lastly, the tension force of the tendon can be measured and controlled in real time through the digitalized system unlike the conventional analog type tension force measurement method, so that through an automatic working process, material costs and labor costs can be drastically reduced to provide many economical advantages.

BEST MODE FOR INVENTION

The present invention relates to a system for monitoring tension forces of tendons disposed inside a concrete structure in post-tensioning, the system including: a hydraulic jack coupled to one tendon at one end of the concrete structure to apply the tension force to the tendon by the forward movement of a piston; a hydraulic pump connected to the hydraulic jack by a hydraulic pressure supply pipe to supply a hydraulic pressure to the hydraulic jack; a digital elongation length measurement sensor disposed on the hydraulic jack to measure the elongation length of the piston; a measurement unit having a data logger adapted to receive and store the elongation length data measured by the digital elongation length measurement sensor and to send the elongation length data to a main server; a digital pressure measurement sensor disposed on the hydraulic pressure supply pipe of the hydraulic pump; and a control module adapted to receive the elongation length data from the data logger or the main server, calculate the tension force, compensate for the coefficient of elasticity of the tendon according to the ratio of the real-time elongation length data to the pressure data, and compensate for the tension force calculated.

MODE FOR INVENTION

Hereinafter, an explanation on a system for monitoring tension forces of tendons in post-tensioning according to the present invention will be in detail given with reference to the attached drawing.

Figure 1:
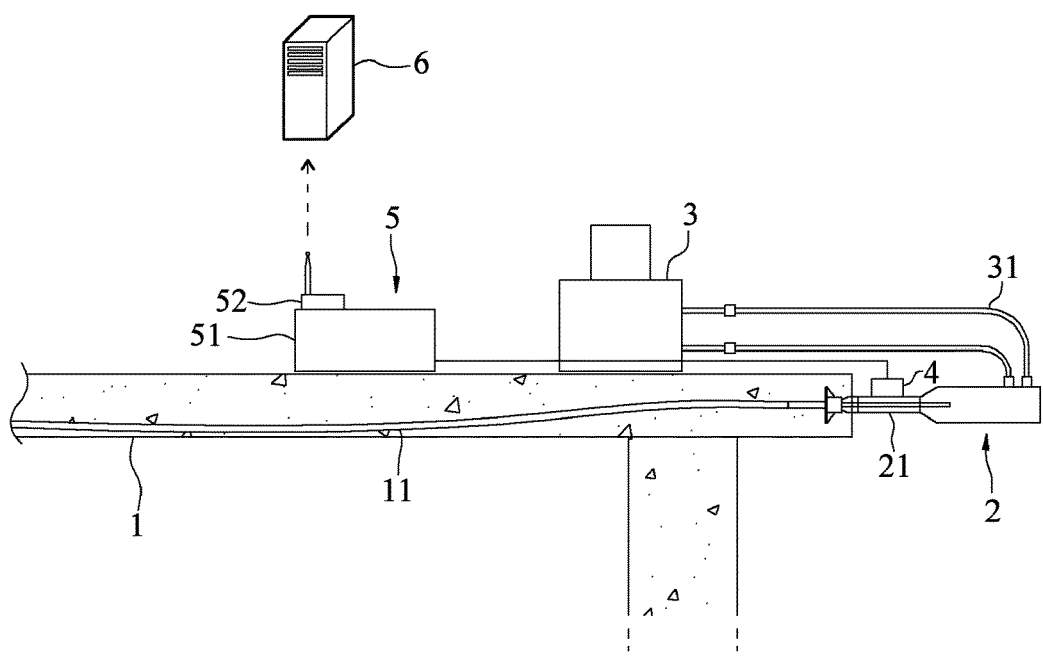
FIG. 1 is a side view showing a system for monitoring tension forces of tendons in post-tensioning according to the present invention.
Figure 2:
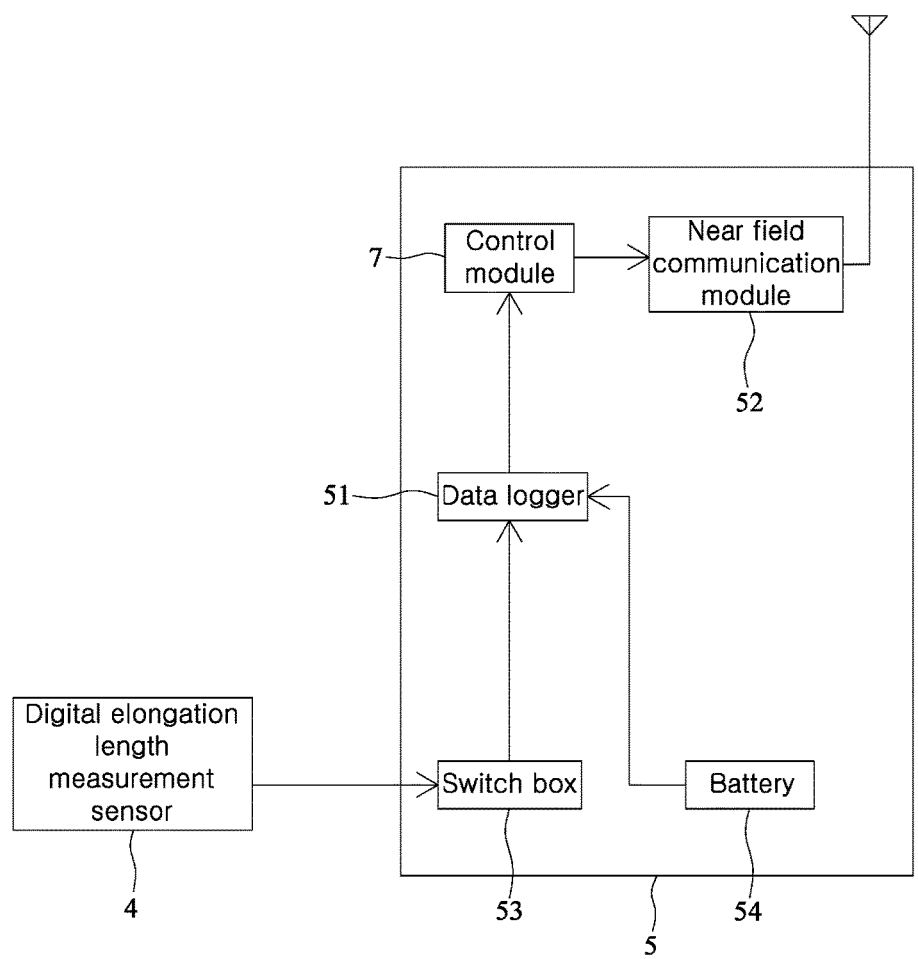
FIG. 2 is a block diagram showing a measurement unit of the system according to the present invention.

FIG. 1 is a side view showing a system for monitoring tension forces of tendons in post-tensioning according to the present invention, and FIG. 2 is a block diagram showing a measurement unit of the system according to the present invention.

According to the present invention, a system for monitoring tension forces of tendons in post-tensioning serves to control the tension forces of tendons 11 disposed inside a concrete structure 1.

In post tensioning where after concrete is cured, the tendons 11 like steel bars are tensioned and anchored in the concrete to introduce the tension thereto, that is, the system according to the present invention measures the individual tension forces of the tendons 11 disposed in concrete beams or slabs to allow the tension forces to be applied uniformly to the tendons 11.

As shown in FIG. 1, the system for monitoring the tension forces of the tendons in post-tensioning according to the present invention includes: a hydraulic jack 2 coupled to one tendon 11 at one end of the concrete structure 1 to apply the tension force to the tendon 11 by the forward movement of a piston 21; a hydraulic pump 3 connected to the hydraulic jack 2 by a hydraulic pressure supply pipe 31 to supply a hydraulic pressure to the hydraulic jack 2; a digital elongation length measurement sensor 4 disposed on the hydraulic jack 2 to measure the elongation length of the piston 21; a measurement unit 5 having a data logger 51 adapted to receive and store the elongation length data measured by the digital elongation length measurement sensor 4 and to send the elongation length data to a main server 6; a digital pressure measurement sensor 8 disposed on the hydraulic pressure supply pipe 31 of the hydraulic pump 3; and a control module 7 adapted to receive the elongation length data from the data logger 51 or the main server 6, calculate the tension force of the tendon 11, compensate for the coefficient of elasticity of the tendon 11 according to the ratio of the real-time elongation length data to the pressure data, and compensate for the tension force calculated.

The tension force of the tendon 11 is proportional to the elongation length of the tendon 11 like the steel bar. The elongation length of the tendon 11 is the same as the elongation length of the piston 21 of the hydraulic jack 2, and according to the present invention, therefore, the elongation length of the piston 21 of the hydraulic jack 2 is accurately measured by the digital elongation length measurement sensor 4.

The digital elongation length measurement sensor 4 includes an extensometer.

The main server 6 stores and controls the measured data like the elongation length data, and through the main server 6, the tension force of the tendon 11 can be monitored in real time even in an office room.

The main server 6 is connected to the data logger 51 of the measurement unit 5 through a network and stores the data collected by the data logger 51 in a database 61, performs the classification, calculation, statisticalization and output of the data, and automatically calculates a maximum value in an error rate or a mean value of the data.

The control module 7 multiplies a strain rate obtained from the elongation length of the piston 21 of the hydraulic jack 2 measured by the digital elongation length measurement sensor 4 by the coefficient of elasticity of the tendon 11 and the effective area of the tendon 11 to calculate the tension force of the tendon 11.

The control module 7 is mounted on any one of the hydraulic pump 3, the data logger 51, the main server 6, and a portable mobile terminal 9 as will be discussed later, or it may be separately provided. Otherwise, as shown in FIG. 2, the control module 7 may be provided in the measurement unit 5.

As shown in FIG. 2, a switch box 53 of the measurement unit 5 receives the data from the digital elongation length measurement sensor 4, and the data introduced to the switch box 53 is primarily processed through the data logger 51 and then sent to the main server 6 or the mobile terminal 9.

According to the present invention, as mentioned above, the elongation length of the piston 21 of the hydraulic jack 2 is accurately measured by the digital elongation length measurement sensor 4, and the elongation length of the piston 21 is multiplied by the coefficient of elasticity of the tendon 11 to accurately measure the tension force of the tendon 11. Accordingly, the tension forces introduced to the plurality of tendons 11 can be converged and controlled by the main server 6.

Figure 3:
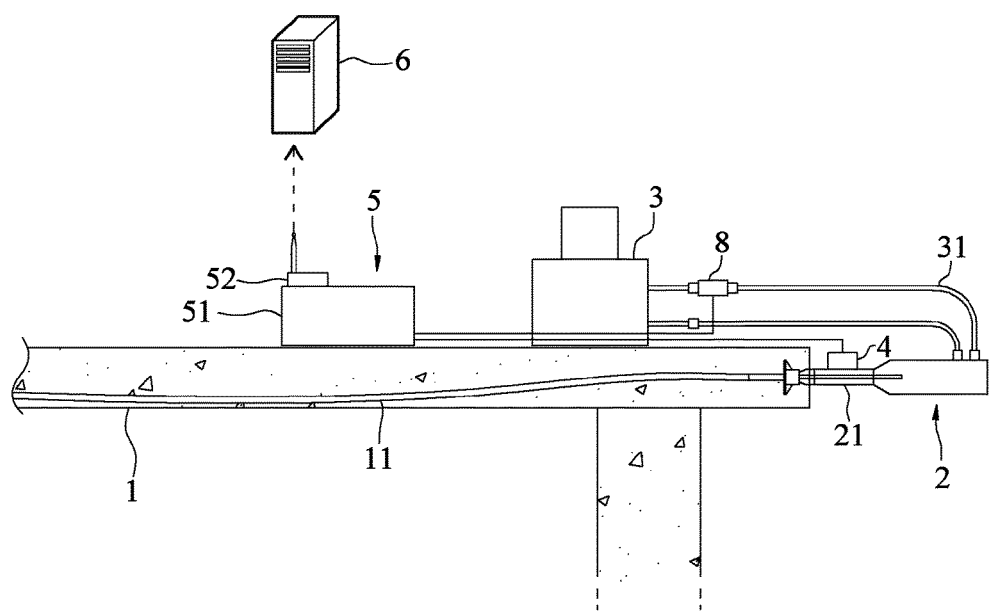
FIG. 3 is a side view showing the system for monitoring tension forces of tendons in post-tensioning according to the present invention, wherein a digital pressure measurement sensor is further provided.
Figure 4:
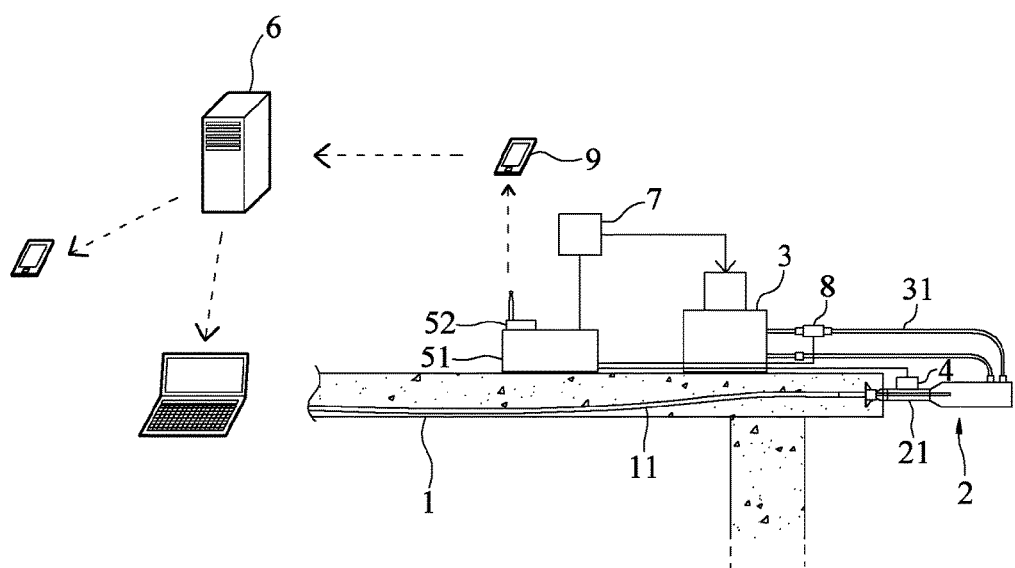
FIG. 4 is a side view showing the system for monitoring tension forces of tendons in post-tensioning according to the present invention, wherein a mobile terminal is further provided.
Figure 5:
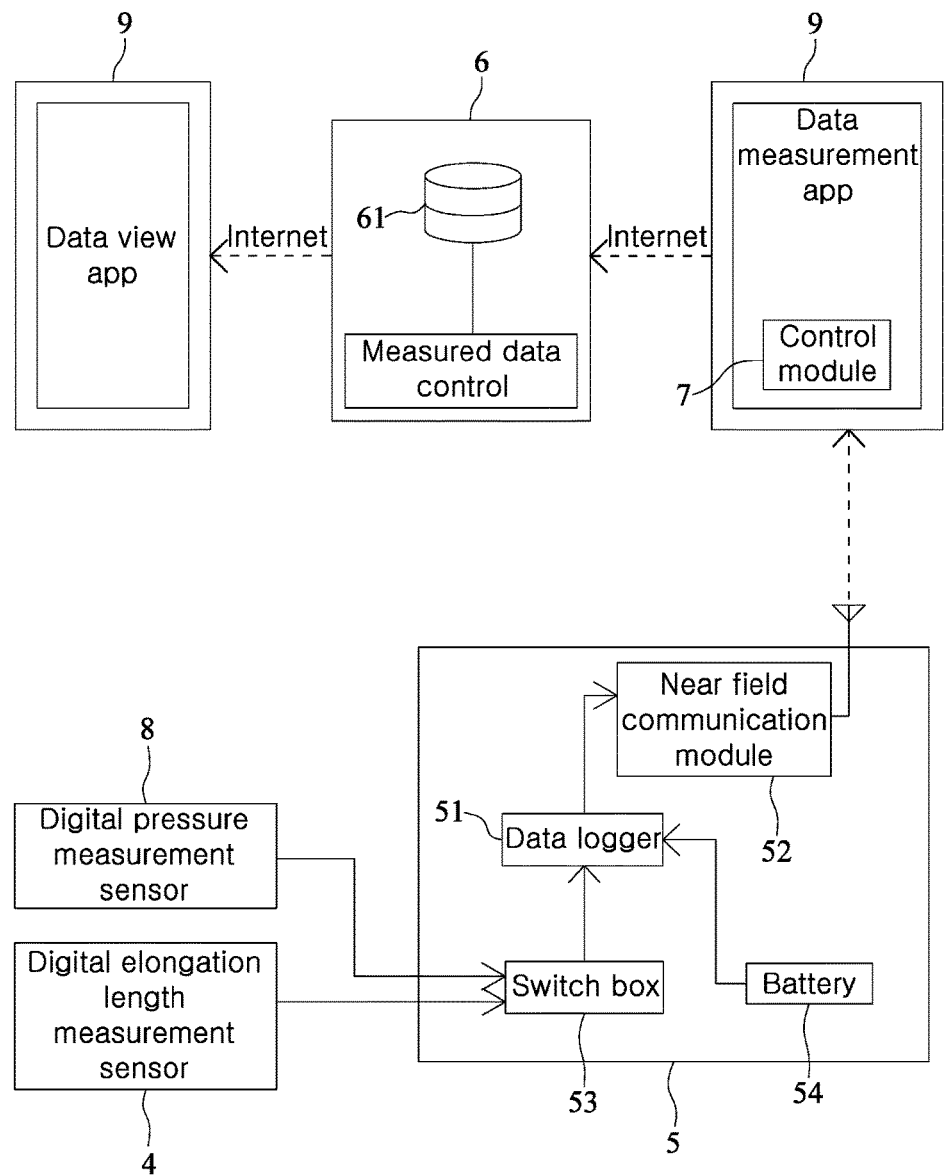
FIG. 5 is a block diagram showing the system for monitoring tension forces of tendons in post-tensioning according to the present invention.

FIG. 3 is a side view showing the system for monitoring tension forces of tendons in post-tensioning according to the present invention, wherein a digital pressure measurement sensor is further provided, FIG. 4 is a side view showing the system for monitoring tension forces of tendons in post-tensioning according to the present invention, wherein a mobile terminal is further provided, and FIG. 5 is a block diagram showing the system for monitoring tension forces of tendons in post-tensioning according to the present invention.

As shown in FIG. 3, the digital pressure measurement sensor 8 is disposed on the hydraulic pressure supply pipe 31 of the hydraulic pump 3.

Since there is a given time difference between the hydraulic pressure supply from the hydraulic pump 3 and the elongation of the piston 21 of the hydraulic jack 2, the elongation length of the piston 21 having the same value as the elongation length of the tendon 11 is directly measured to calculate the tension force of the tendon 11, which is most accurate. If the tendon 11 slips from the hydraulic jack 2, however, it is more accurate to calculate the tension force of the tendon 11 through the pressure data measured by the digital pressure measurement sensor 8.

In addition to the calculation of the tension force of the tendon 10 using the elongation length of the piston 21 of the hydraulic jack 2 obtained by the digital elongation length measurement sensor 4, the hydraulic pressure of the fluid supplied from the hydraulic pump 3 to the hydraulic jack 2 can be additionally measured by the digital pressure measurement sensor 8 to calculate the tension force of the tendon 10.

If the tension force of the tendon 10 is measured doubly by the digital elongation length measurement sensor 4 and the digital pressure measurement sensor 8, the tension force can be more accurately calculated.

At this time, if the pressure data measured by the digital pressure measurement sensor 8 reaches a set value, the hydraulic pump 3 is controlled by the control module 7 to stop the operation of the hydraulic jack 2.

In conventional practices wherein the hydraulic jack 2 is manipulated manually, the stop point of the piston 21 of the hydraulic jack 2 is lost to cause the tendon 11 to be momentarily yielded.

Accordingly, as shown in FIG. 4, the control module 7 controls the hydraulic pump 3 using the pressure data to stop the operation of the hydraulic jack 2.

Of course, the hydraulic jack 2 may stop through the monitoring of the elongation length data, but as mentioned above, there is a given time difference between the hydraulic pressure supply from the hydraulic pump 3 and the elongation of the piston 21 of the hydraulic jack 2. If the hydraulic pump 3 is controlled through the elongation length data, accordingly, the stop point of the piston 21 of the hydraulic jack 2 may be lost to cause the tendon 11 to be undesirably yielded, so that it is desirable to control the hydraulic pump 3 through the pressure data.

Most desirably, the tension force of the tendon 11 is calculated through the elongation length data, and the operation of the hydraulic pump 3 is controlled through the pressure data.

If the digital pressure measurement sensor 8 is disposed on the hydraulic pressure supply pipe 31 of the hydraulic pump 3, the control module 7 compensates for the tension force calculated according to the ratio of the real-time elongation length data to the pressure data.

Since the tendon 11 like the steel bar has the elastic behavior before yielded, it is concluded that the tension force of the tendon 11 is proportional to the elongation length of the piston 21, but the tendon 11 has a partially non-elastic behavior in the section except an elastic section, so that it does not have the elastic behavior accurately and perfectly. So as to calculate an accurate constant, accordingly, the control module 7 compensates for the coefficient of elasticity of the tendon 11 according to the ratio of the real-time elongation length data to the pressure data.

As shown in FIGS. 4 and 5, the measurement unit 5 includes a near field communication module 52 for transmitting the collected data to the mobile terminal 9, and the mobile terminal 9 transmits the received data to the main server 6.

The mobile terminal 9 is a smartphone, and the near field communication module 52 performs NFC (Near Field Communication), Bluetooth, ZigBee, infrared ray communication, UWB (Ultra-wideband) and the like.

FIG. 5 shows the case wherein the control module 7 is installed in an application of the mobile terminal 9, and so as to control the hydraulic pump 3 by the control module 7, in this case, the hydraulic pump 3 has to have a communication module for receiving the signal from the mobile terminal 9.

The mobile terminal 9 like a user's smartphone is placed between the main server 6 and the data logger 51.

The data logger 51 transmits the data through the near field communication module 52, and accordingly, no internet environment is separately needed.

The data collected in the measurement unit 5 can be checked directly by the mobile terminal 9 of the user on the construction site.

If the mobile terminal 9 is the smartphone, moreover, a data measurement application is installed, and next, the control module 7 is installed in the data measurement application.

At this time, the main server 6 transmits the collected data to a manager's terminal like PC, smartphone and so on through internet, so that the data can be checked even at the long distance from the construction site. In case of the smartphone, the data can be checked through a data view application.

The data view application and the data measurement application may be the same as each other.

Figure 6:
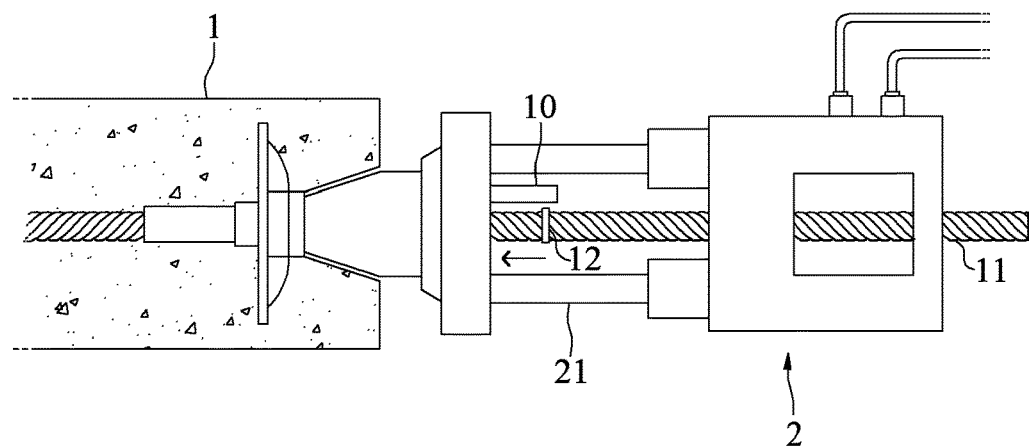
FIG. 6 is a sectional view showing a hydraulic jack having a position sensor.

FIG. 6 is a sectional view showing the hydraulic jack having a position sensor.

As shown in FIG. 6, a reference point 12 is marked on one side of the tendon 11 exposed to the outside of the concrete structure 1, and a position sensor 10 is disposed on one side of the hydraulic jack 2 to measure the moving distance of the reference point 12, so that after the operation of the hydraulic jack 2 stops by the control module 7, the compensation for the elongation length is performed according to the moving distance of the reference point 12 measured by the position sensor 10.

The value measured by the digital elongation length measurement sensor 4 or the digital pressure measurement sensor 8 is obtained at the maximum forward moving length point of the piston 21 of the hydraulic jack 2.

If the hydraulic pressure of the hydraulic jack 2 is released, however, the tension force of the tendon 11 is partially released to cause the tendon 11 to be returned by a given length, so that a wedge is engaged with the tendon 11 and fixed to the tendon 11.

Accordingly, there is a difference between the tension force at the time point when the hydraulic pressure of the hydraulic jack 2 is released and the tension force at the time point when the wedge is fixed to the tendon 11, so that the real tension force is somewhat smaller than the measured tension force.

Accordingly, the elongation length is measured by the position sensor 10 to compensate for the real tension force of the tendon 11, so that the tension force of the tendon 11 can be more accurately measured.

While the tension force is being applied to the tendon 11, in more detail, the reference point 12 marked on one side of the tendon 11 is moved backward from the concrete structure 1, and if the tension force is released from the tendon 11, the reference point 12 is moved forward in a reverse direction thereof until the tendon 11 is fixedly engaged with the wedge after the fixation of the tendon 11 to the hydraulic jack 2 has been released. At this time, the position sensor 10 measures the forward moving length of the tendon 11.

INDUSTRIAL APPLICABILITY

The present invention can accurately measure the elongation length of the piston of the hydraulic jack through the digital elongation length measurement sensor and multiply the measured elongation length by the coefficient of elasticity of the tendon to accurately measure the tension force of each tendon, so that the tension forces introduced into the plurality of tendons can be controlled through the main server, thereby permitting the controlled tension forces to be uniformly applied to the plurality of tendons. Further, the pressure of the fluid supplied to the hydraulic jack from the hydraulic pump can be measured through the digital pressure measurement sensor to measure the tension force of the tendon, so that in addition to the measurement of the tension force of the tendon using the elongation length of the piston of the hydraulic jack, the tension force of the tendon can be doubly measured through the digital pressure measurement sensor, thereby making it possible to calculate the tension force of the tendon more accurately.

What is claimed is:

1. A system for monitoring the tension forces of tendons disposed inside a concrete structure in post-tensioning, the system comprising:
   a hydraulic jack coupled to one tendon at one end of the concrete structure to apply the tension force to the tendon by the forward movement of a piston;
   a hydraulic pump connected to the hydraulic jack by a hydraulic pressure supply pipe to supply a hydraulic pressure to the hydraulic jack;
   a digital elongation length measurement sensor disposed on the hydraulic jack to measure the elongation length of the piston;
   a measurement unit having a data logger adapted to receive and store the elongation length data measured by the digital elongation length measurement sensor and to send the elongation length data to a main server;
   a digital pressure measurement sensor disposed on the hydraulic pressure supply pipe of the hydraulic pump; and
   a control module adapted to receive the elongation length data from the data logger or the main server, calculate the tension force, compensate for the coefficient of elasticity of the tendon according to the ratio of real-time elongation length data to pressure data, and compensate for the tension force calculated.

2. The system according to claim 1, wherein if the pressure data measured by the digital pressure measurement sensor reaches a set value, the hydraulic pump is controlled by the control module to stop the operation of the hydraulic jack.

3. The system according to claim 1, wherein the measurement unit comprises a near field communication module for transmitting the collected data to a mobile terminal, and the mobile terminal transmits the received data to the main server.

4. The system according to claim 1, wherein a reference point is marked on one side of the tendon exposed to the outside of the concrete structure, and a position sensor is disposed on one side of the hydraulic jack to measure the moving distance of the reference point, so that after the operation of the hydraulic jack stops by the control module, the compensation for the elongation length is performed according to the moving distance of the reference point measured by the position sensor.

* * * * *